United States Patent
Bejerano et al.

(10) Patent No.: US 9,350,641 B2
(45) Date of Patent: May 24, 2016

(54) IP FAST REROUTE SCHEME OFFERING FULL PROTECTION

(75) Inventors: Yigal Bejerano, Springfield, NJ (US);
Spyridon Antonakopoulos, New Providence, NJ (US); Pramod V. Koppol, Manalapan, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1026 days.

(21) Appl. No.: 13/436,098

(22) Filed: Mar. 30, 2012

(65) Prior Publication Data

US 2013/0107698 A1     May 2, 2013

Related U.S. Application Data

(60) Provisional application No. 61/554,341, filed on Nov. 1, 2011.

(51) Int. Cl.
*H04L 12/26*    (2006.01)
*H04L 12/733*    (2013.01)
*H04L 12/751*    (2013.01)
*H04L 12/705*    (2013.01)
(Continued)

(52) U.S. Cl.
CPC ............ *H04L 45/122* (2013.01); *H04L 45/02* (2013.01); *H04L 45/18* (2013.01); *H04L 45/24* (2013.01); *H04L 45/28* (2013.01); *H04L 45/48* (2013.01)

(58) Field of Classification Search
CPC ....................................... H04L 12/26
USPC ........................................ 370/218
See application file for complete search history.

(56) References Cited

U.S. PATENT DOCUMENTS 5,872,773 A    2/1999   Katzela et al.
7,864,669 B2 *   1/2011   Bonaventure et al. ........ 370/225
(Continued)

FOREIGN PATENT DOCUMENTS

JP     2011-66536 A     3/2011

OTHER PUBLICATIONS

International Search Report and Written Opinion in PCT/US2012/062955 dated Feb. 18, 2013.
(Continued)

*Primary Examiner* — Dang Ton
*Assistant Examiner* — Nourali Mansoury
(74) *Attorney, Agent, or Firm* — Kramer & Amado, P.C.

(57) ABSTRACT

An IP fast reroute scheme offering full protection is disclosed for reducing the number of address lookups associated with a message packet. The IP fast reroute scheme offering full protection includes a router configured to forward the arriving packet to a next-hop neighbor node according to one of a first pointer and a second pointer associated to a destination node in a forwarding information table stored in a forwarding information memory storage; the first pointer is directed to a first next-hop neighbor node which is on the shortest path from the network node to the destination node; and the second pointer is directed to a second next-hop neighbor node different from the first next-hop neighbor node, the second next-hop neighbor node on a candidate cycle containing both the network node and the destination node having the greatest overlap with a sink tree rooted at the destination node. The IP fast reroute scheme offering full protection is particularly useful for providing full protection against single link and node failures with a simple method requiring no packet modifications.

20 Claims, 6 Drawing Sheets

(51) Int. Cl.
 *H04L 12/707* (2013.01)
 *H04L 12/703* (2013.01)
 *H04L 12/753* (2013.01)

(56) References Cited

U.S. PATENT DOCUMENTS

2005/0078656 A1 4/2005 Bryant et al.
2006/0002291 A1 1/2006 Alicherry et al.
2010/0189113 A1* 7/2010 Csaszar et al. ............... 370/400

OTHER PUBLICATIONS

Preliminary Rejection for KR Patent Application No. 2014-7011710 dated Dec. 8, 2014.
Xi et al., IP Fast Rerouting for Single-Link/Node Failure Recovery, polytechic university, Apr. 2006, New York State, Center for Advanced Technology in Communications, pp. 1-3.

* cited by examiner

US 9,350,641 B2

IP FAST REROUTE SCHEME OFFERING FULL PROTECTION

RELATED APPLICATIONS

This application incorporates by reference and claims priority to U.S. provisional patent application Ser. No. 61/554,341 filed Nov. 1, 2011.

FIELD OF THE INVENTION

The invention relates to generally to packet rerouting in the event of failures in the network and is particularly concerned with a method of packet rerouting which reduces convergence time while providing full protection coverage of the network.

BACKGROUND OF THE INVENTION

Modern IP (Internet Protocol) networks carry traffic data of numerous time-sensitive applications, such as video conferencing and interactive multiplayer games. Consequently, a network is required to offer a very high level of service quality (QoS) and availability. It is no surprise, then, that service providers go to great lengths to guarantee that their networks perform satisfactorily in those respects. Nevertheless, unexpected component failures as well as scheduled maintenance procedures often result in periods of degraded network performance.

One of these periods of degraded network performance are called convergence periods, because they correspond to the time needed by the network's Interior Gateway Protocol (IGP), e.g. Open Shortest Path First (OSPF), to converge after a topology change takes place. More specifically, within each such period every router updates its forwarding information base (FIB) tables independently, as information about the topology change is propagated through the network. Consequently, forwarding tables of different routers may be temporarily inconsistent with each other, leading to traffic being caught in forwarding loops and/or discarded.

Convergence periods typically last for hundreds of milliseconds, or even seconds. Unfortunately, such a long recovery time is not acceptable for most real-time applications. By contrast, a sub-50-millisecond recovery time, like that of SONET/SDH and MPLS networks, would be desirable to ensure that consumers hardly notice any adverse effects.

On a related note, energy efficiency has recently become an important concern for service providers. One popular technique to reduce energy consumption involves dynamically dimensioning the network to meet the current traffic demand, for example by temporarily switching off unneeded links and routers. Like any other topology change, however, these operations are liable to have a negative impact on network performance, and may occur rather frequently. Therefore, attaining a low recovery time from such events gains even greater significance, because without it the aforementioned energy-saving measures are unlikely to be widely adopted.

RELATED WORK

The need to maintain a high level of QoS and availability for IP networks even in the presence of topology changes requires approaches to minimize network service disruption during convergence periods. In MPLS networks, this is accomplished by Fast Reroute (FRR). Namely, for each potential component failure, dedicated detour paths that circumvent it are provisioned. Should such a failure indeed occur, traffic is automatically diverted to the appropriate detour path. Thus, MPLS-FRR effectively guarantees a 50 ms failure recovery time, with negligible packet losses.

A similar solution for IP networks is termed IP Fast Reroute (IP FRR). In IP FRR, a packet that cannot be sent over a failed component is deflected to an alternative router, which in turn forwards the packet to its destination. However, unlike MPLS-FRR, where the detour path is provisioned as a dedicated MPLS tunnel, in IP networks each router makes independent local routing decisions. This destination based forwarding paradigm gives rise to serious issues in the implementation of IP FRR, as explained below.

Immediately after a failure takes place and is detected, only adjacent routers are aware of it; these are called local repair routers (LRRs). Hence, a packet that has been diverted by an LRR to a non-LRR alternative next hop may be routed back to the same LRR, directly or indirectly, thus entering a forwarding loop. Several IP FRR proposals, such as the Equal Cost Multiple Path (ECMP) and Loop-Free Alternate (LFA) schemes, avoid this problem by stipulating that packets should be forwarded only to alternate neighbors satisfying certain simple properties that guarantee loop-free delivery. For instance, consider the network depicted in FIG. 1A after the failure of node 107. The LFA scheme enables node 105 to recover from this failure by deflecting traffic destined for 110 to node 109, which constitutes a loop-free alternate.

Another scheme, the so-called U-Turn scheme, extends LFA by allowing an LRR to backtrack packets to an upstream neighbor, which subsequently forwards them to one of its own neighbors that is a loop-free alternate. Consequently, in case link 107-108 of the network in FIG. 1A fails, node 107 can send packets destined for 110 to node 105, and the latter bypasses the failure by forwarding them to node 109.

While the above schemes are easy to implement, they do not guarantee loop-free recovery for every potential failure. This happens when an LRR has no neighbors that satisfy the properties stipulated by the scheme, a problem that tends to be especially common in networks with low average node degree. Evaluation studies have shown that LFA protects against many more failures than ECMP, and U-turn protects against more failures than LFA, but they also reveal that even U-turn typically offers protection against only about 90% of all possible link failures and less than 75% of node failures. For example, in case node 108 of the network in FIG. 1A fails, none of those schemes can successfully route packets from LRR 107 to destination 110, although FIG. 1B shows that there is a path from 107 to 110 still available as indicated by the doubled arrows.

Other IP FRR schemes use various techniques for marking packets on a detour, such as using tunnels, adding a list of failed components to the IP header, or specifying forbidden addresses, termed not-via addresses. Some schemes, such as SafeGuard, advocate modifications of the IP header to implicitly identify the failed component. Moreover, the scheme described in the Proceedings of IEEE INFOCOM; "*IP fast reroute: Lightweight not-via without additional addresses*", pages 2771-2775, 2009, G. Enyedi, P. Szilágyi, G. Rétvári, and A. Császár; pre-calculates alternative routing trees for each destination and uses some bits of the IP header to identify the desired forwarding paths. Although these solutions support fast recovery for most possible failures, they suffer from significant shortcomings: diverted packets need to go through additional processing that can only take place in the router slow path, and in some cases they may have to be fragmented, if the extra embedded information makes them exceed MTU size.

Furthermore, in IEEE/ACM Transactions on Networking, 15(2):359-372, 2007, "*Fast local rerouting for handling tran-* sient link failures"; S. Nelakuditi, S. Lee, Y. Yu, Z.-L. Zhang and C.-N. Chuah, introduced an interface specific forwarding scheme that enables routers to infer, based on the incoming interface of a packet, whether there is a failure in the network. Then, the packet's next hop is determined by taking into account both its incoming interface as well as its destination. The authors show that said scheme provides loop-free detours for any component failure, but this achievement comes at the considerable cost and complexity of maintaining a dedicated forwarding table for each router interface.

The apparent lack of a simple IP FRR solution motivated a number of proposals for alternative routing paradigms, which typically leverage the path diversity of networks. One such approach is the Multiple Routing Configurations (MRC) mechanism which builds backup routing topologies (called configurations) so that that each link and node is isolated in at least one backup topology. After a failure, the packets are routed along some configuration in which the failed component is isolated. Although MCR can solve the fast recovery problem, it faces implementation issues such as designing configurations that isolate each component and selecting an appropriate configuration for routing. Other studies utilize path diversity by routing packets along a pre-calculated directed acyclic graph (DAG) of each given destination. In this routing paradigm, packets are not necessarily routed along the shortest path, yet there is no guarantee that the DAG provides protection to every possible failure. Last but not least, G. Rétvári, J. Tapolcai, G. Enyedi, and A. Császár in "*IP fast reroute: Loopfree alternates revisited*", in Proceedings of IEEE INFOCOM, 2011, proposed to augment networks with additional links to ensure that the LFA scheme can provide recovery for all possible failures.

Therefore, it would be desirable to have a method or apparatus capable of ensuring that during the network convergence time packets will reach their destinations either along the shortest path, or through an alternative path if one of the links/routers along their shortest paths is down, that minimizes the drawbacks and complexity of the present art.

SUMMARY OF THE INVENTION

It is an object of the invention to provide a method and apparatus of packet classification which, during the network convergence time, ensures that packets will reach their destinations either along the shortest path, or through an alternative path for a network.

All the solutions mentioned in the previous section either cannot protect against all potential failures, or they are difficult to implement, or both. Herein, is disclosed a novel, simple and efficient IP FRR scheme, named disjoint paths recovery (DisPath), which has the following advantageous properties:

1) DisPath preserves the traditional destination-based IP routing paradigm, and in the stable network state packets are forwarded along the shortest paths to their destinations.

2) Packets are not modified in any way (except for appropriate standard operations such as TTL decrement and new header checksum computation).

3) DisPath maintains only two pointers per destination node in the forwarding table of each router: one for the primary and one for the alternate next-hop neighbor. Obviously, this is the minimum number of pointers required to implement a recovery scheme.

4) Provided a recovery path exists, DisPath provides full coverage, i.e. protection against every potential failure of a single component regardless of network topology.

5) The DisPath scheme gracefully avoids transient routing loops even in the presence of multiple failures.

Note that Properties 2 and 3 make the solution relatively straightforward to implement with current router technology. It is also noted that Property 4 is very desirable for energy efficient networks that may have very low average node degree due to dynamic deactivation of redundant routers and links.

Furthermore, simulations on representative network instances indicate that DisPath performs very well in terms of stretch, i.e. the ratio of the length of a rerouted packet's trajectory to the length of the shortest path that avoids the failed network component, which is a commonly used performance measure. Together with the properties above, this suggests that DisPath fulfills the goal of designing a simple and practical IP FRR scheme that ensures full coverage.

Thus, according to an aspect of the invention there is provided a network element at a network node for routing an arriving packet having a destination node, the network element having a router configured to forward the arriving packet to a next-hop neighbor node according to one of a first pointer and a second pointer associated to the destination node in a forwarding information table stored in a forwarding information memory storage; the first pointer is directed to a first next-hop neighbor node which is on the shortest path from the network node to the destination node; and the second pointer is directed to a second next-hop neighbor node different from the first next-hop neighbor node, the second next-hop neighbor node on a candidate cycle containing both the network node and the destination node having the greatest overlap with a sink tree rooted at the destination node.

In some embodiments of the invention the router is configured to forward the arriving packet according to the first pointer in the event that the arriving packet arrives from a neighboring node other than the next-hop neighbor node indicated by the first pointer. In some of these embodiments the router is configured to forward the arriving packet according to the second pointer in the event that the arriving packet arrives from the next-hop neighbor node indicated by the first pointer. In some of these embodiments the router is configured to forward the arriving packet according to the second pointer in the event that the next-hop neighbor node indicated by the first pointer cannot forward packets. In some of these embodiments the router is configured to forward the arriving packet according to the second pointer in the event that the link to the next-hop neighbor node indicated by the first pointer cannot forward packets.

In other embodiments of this aspect of the invention the network element further has a first flag and a second flag associated to the destination node in the forwarding information table stored in a forwarding information memory storage; the first flag indicating an operational state of the shortest path from the network node to the destination node; the second flag indicating whether the link from the network node to the second next-hop node is an element of the sink tree rooted at the destination node; and the router configured to drop the arriving packet in the event that the first flag indicates a non-operational state and that the second flag indicates that the network node to the second next-hop node is an element of the sink tree rooted at the destination node and that the arriving packet arrives from the next-hop neighbor node indicated by the first pointer.

In some of these embodiments the router is configured to forward the arriving packet according to the first pointer in the event that the arriving packet arrives from a neighboring node other than the next-hop neighbor node indicated by the first pointer. In other of these embodiments the router is configured to forward the arriving packet according to the second pointer in the event that the arriving packet arrives from the next-hop neighbor node indicated by the first pointer. In other of these embodiments the network element has the router configured to forward the arriving packet according to the second pointer in the event that the next-hop neighbor node indicated by the first pointer cannot forward packets. In yet other of these embodiments the router forwards the arriving packet according to the second pointer in the event that the link to the next-hop neighbor node indicated by the first pointer cannot forward packets.

In other embodiments of this aspect of the invention the network element configured that in the event of an arrival of network configuration information indicating a new network configuration for the network that the network element is a node therein, the forwarding information table is updated at a time succeeding the time period by which ancestral nodes to the network node on the sink tree corresponding to the new network configuration have been reconfigured.

According to another aspect of the invention there is disclosed a method of automatically calculating a primary pointer and a backup pointer associated to a destination node in a forwarding information table stored in a forwarding information memory storage in a first network node of a network having a network configuration stored in a memory device, the method having the steps of: calculating a sink tree rooted at the destination node using the network configuration of the network; calculating a shortest path from the first network node to the destination node using the network configuration of the network; directing the primary pointer to a first next-hop neighbor node which is on the shortest path from the first network node to the destination node; directing the backup pointer to a second next-hop neighbor node different from the first next-hop neighbor node, the second next-hop neighbor node on the candidate cycle containing both the first network node and the destination node having the greatest overlap with a sink tree rooted at the destination node.

In some of these embodiments there are the further steps of: repeating the second calculating step and the directing steps for all nodes of the network other than the network node and the destination node. In some of these embodiments there are the further steps of: receiving an update to the network configuration; storing the update in the memory device; calculating a new sink tree rooted at the destination node using the updated network configuration of the network; updating the forwarding information table at a time succeeding the time period by which ancestral nodes to the network node on the sink tree corresponding to the new network configuration have been reconfigured by repeating the second calculating step and the directing steps for all nodes of the network other than the network node. In some of these embodiments the time period is calculated according to the hop-count distance of the nearest ancestor in the new sink tree to the network node for which the path in the new sink tree from the nearest ancestor to the destination node has not changed.

According to yet another aspect of the invention, there is disclosed a method of automatically calculating a backup pointer associated to a destination node in a forwarding information table stored in forwarding information memory storage in a first network node of a network having a network configuration stored in a memory device, the method having the steps of: calculating a sink tree rooted at the destination node using the network configuration of the network; calculating the shortest candidate cycle containing both the first network node and the destination node, and wherein a tie-breaking criterion for candidate cycles comprises having the greatest overlap with the sink tree rooted at the destination node using the network configuration of the network; calculating a shortest path from the first network node to the destination node using the network configuration of the network; determining a first next-hop neighbor node which is on the shortest path from the first network node to the destination node; and directing the backup pointer to a second next-hop neighbor node different from the first next-hop neighbor node.

In some embodiments of this aspect of the invention there are the further steps of repeating the calculating, the determining, and the directing steps for all nodes of the network other than the network node and the destination node.

Note: in the following the description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

BRIEF DESCRIPTION OF THE DRAWINGS

The present invention will be further understood from the following detailed description of embodiments of the invention, with reference to the drawings in which like reference numbers are used to represent like elements, and.

DETAILED DESCRIPTION

Figure 1A:
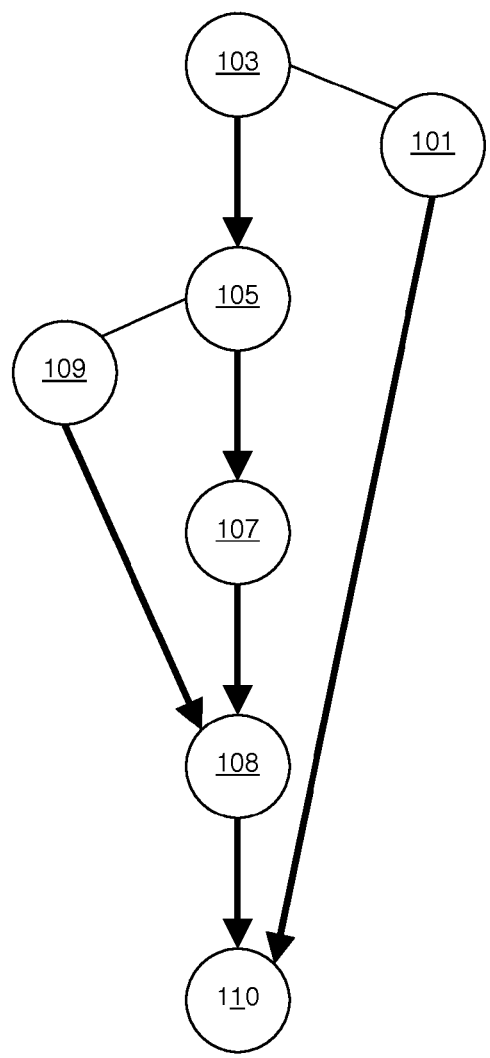
FIGS. 1A and 1B illustrates a network of nodes having connecting links according to the prior art.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, cooperate or interact with each other. "Connected" is used to indicate the establishment of communication between two or more elements that are coupled with each other.

The techniques shown in the figures can be implemented using code and data stored and executed on one or more electronic devices (e.g., a network element). Such electronic devices store and communicate (internally and with other electronic devices over a network) code and data using machine-readable media, such as machine storage media (e.g., magnetic disks; optical disks; random access memory; read only memory; flash memory devices) and machine communication media (e.g., electrical, optical, acoustical or other form of propagated signals—such as carrier waves, infrared signals, digital signals, etc.). In addition, such electronic devices typically include a set of one or more processors coupled to one or more other components, such as a storage device, one or more user input/output devices (e.g., a keyboard and/or a display), and a network connection. The coupling of the set of processors and other components is typically through one or more busses and bridges (also termed as bus controllers). The storage device and signals carrying the network traffic respectively represent one or more machine storage media and machine communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software that communicatively interconnects other equipment on the network (e.g., other network elements, computer end stations, etc.). Customer computer end stations (e.g., workstations, laptops, palm tops, mobile phones, etc.) access content/services provided over the Internet and/or content/services provided on associated networks such as the Internet. The content and/or services are typically provided by one or more server computing end stations belonging to a service or content provider, and may include public webpages (free content, store fronts, search services, etc.), private webpages (e.g., username/password accessed webpages providing email services, etc.), corporate networks over VPNs, etc. Typically, customer computing end stations are coupled (e.g., through customer premise equipment coupled to an access network, wirelessly to an access network) to edge network elements, which are coupled through core network elements of the Internet to the server computing end stations.

In the following figures, like reference numbers are used to represent like elements.

Network Model

The following embodiments of the invention will be described with respect to an IP network. Consider an IP network that constitutes a single routing area. All routers maintain link state information that allows them to calculate the network topology and consequently the shortest path to every other router in the network. Routers use this information to populate their forwarding information base (FIB) tables. When an IP packet arrives at a router, the latter checks the packet destination address against its FIB to determine the next-hop neighbor, i.e. the next router along the shortest path to that destination, and forwards the packet accordingly. For the sake of simplicity, it is assumed that if there exist multiple shortest paths to a given destination, the router selects a unique next-hop neighbor according to a known and consistent tie-breaking criterion.

The network is considered at a stable state when all the routers have the same view of the network topology. In case of a topology change, routers adjacent to the added or removed component, whether a router or a link, detect the change and generate link state advertisement (LSA) messages to inform other routers about it. This information is propagated in the network through flooding and it is used by all routers to update their FIBs. Convergence time refers to the time interval between the initial detection of a topology change to the point where all routers have updated their FIBs, after which the network is in a stable state again.

In the following sections, the network is modeled as an undirected graph $G(V;E)$, where V denotes the set of routers, also termed nodes, and E represents the set of links, also termed edges. Each link $e \in E$ is bidirectional and, for the purpose of routing, has an associated integer weight $w(e)$. Moreover, G is assumed to be biconnected, meaning that it remains connected in the event of a single link or node failure. Note that some of the above assumptions serve only to make the exposition clearer. As is disclosed infra adaptations of the methods of the invention scheme to non-biconnected graphs and graphs whose links have different weights in each direction is readily possible.

Scheme Overview

DisPath is based on the fact that in a biconnected network every node v has two node-disjoint paths to any given destination t, by Menger's Theorem. Thus, in case of a failure along the shortest path from v to t, there is still an alternative path available.

Let $p_v(t)$ denote the primary neighbor of v for destination t, i.e. the next-hop neighbor of v along its shortest path to t. In the event of a failure, node v diverts packets to an alternative path, and let $b_v(t)$ denote the backup neighbor, i.e. the next-hop neighbor of v along the alternative path.

According to embodiments of the invention, a node v has two ways of knowing whether a failure has occurred along the primary path to t. The standard one is if v is adjacent to the failure and detects it directly. Another is if v receives a packet destined for t from $p_v(t)$, which is not supposed to happen in a stable state. In either case, v forwards the packet to the backup neighbor $b_v(t)$. Note that this method can be implemented without any modification to the packets themselves.

Figure 1B:
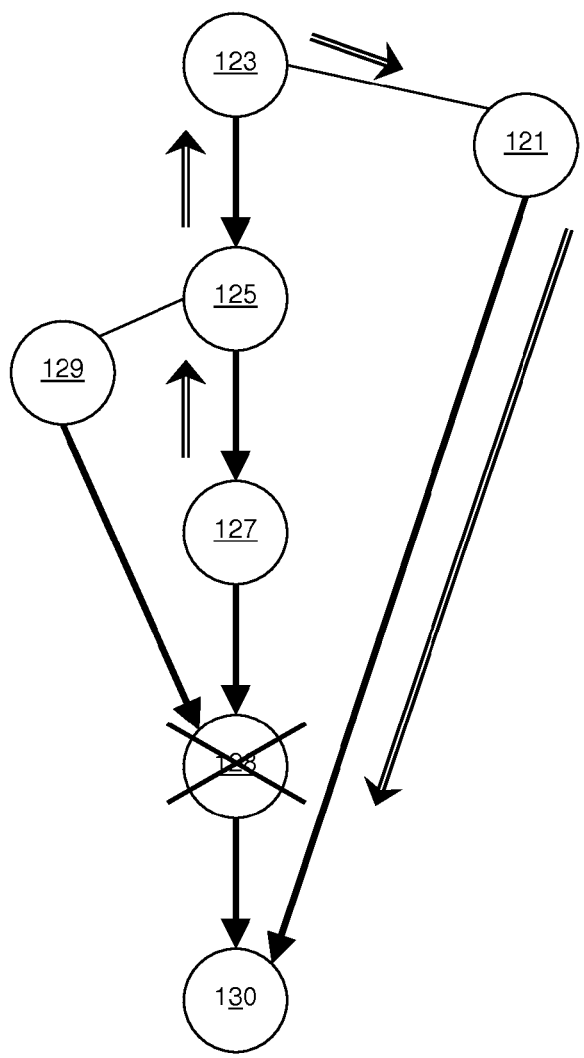

By way of example, consider the network in FIG. 1B with a packet arriving at node 127 having a destination of node 130, but with node 128 having failed. After the failure of node 128, node 127 has an alternative path to 130 via nodes 125, 123, and 121. When node 125 gets a packet for node 130 from node 127, it detects a failure and sends the packet to its backup neighbor, node 123. The latter also detects a failure and forwards the packet to its own backup neighbor, node 121, which then routes the packet to the destination node 130.

The success of DisPath in providing loop-free recovery hinges on each node properly selecting the primary and backup neighbors for every destination. For that purpose, each node v computes the shortest simple cycle $C_{v;t}$ that contains both v and the destination t. The two neighboring nodes of v in $C_{v;t}$ become the primary and backup neighbors. Such a cycle always exists, since the network is biconnected, but is not necessarily unique. This could pose a serious obstacle, because not any shortest cycle will work, as illustrated by the next example.

Consider the network in FIG. 2, and observe that there are several shortest cycles that contain node 206 and destination node 212; the same is true for nodes 201 and 212, etc. Suppose that nodes 206 and 203 pick the cycle represented by the dotted line on the left, whereas nodes 201 and 204 pick the cycle represented by the dashed line on the right. Upon failure of the link (206; 208), node 206 has no option but to forward a packet destined for 212 to 203, which in turn must send it to 201. However, 203 is neither the primary (as indicated by the dark arrows connecting node 201 to node 204) nor the backup neighbor of node 201 (which is node 202 as node 201 is using the cycle represented by the dashed line on the right), so node 201 forwards the packet to node 204 (which is closer to node 212), and node 204 sends it onward to node 206, which is where the packet started the cycle due to the failure of the link (206; 208). Thus, the packet enters a forwarding loop, which is undesirable.

However, according to an embodiment of the invention, there is a simple and elegant solution to the problem of selecting an appropriate cycle, which is disclosed as follows. Let T(t) denote the sink tree of t, i.e. the tree rooted at t formed by the union of shortest paths from all other nodes to t; in the literature, this is sometimes referred to as reverse shortest path tree or rSPT. If the network is in a stable state, each node can determine T(t) independently, as long as all nodes apply the same tie-breaking criterion.

Then, according to methods embodying the invention, the sink tree itself is used as a tie-breaking criterion in the computation of shortest cycles. In particular, when a node v computes the shortest cycle containing v and t, it breaks ties in favor of cycles having greater overlap with T(t). This is achieved by an appropriate manipulation of link weights.

Now, it may be shown that the cycle $C_{v;t}$ thus computed by node v has the following property: one of the two neighbors of v in $C_{v;t}$ is the next node in the shortest path to t, so naturally it should become the primary neighbor $p_v(t)$. It can also be shown that this property has very beneficial consequences:

It ensures that packets are routed along the shortest paths to their destinations, while the network is in a stable state.
It guarantees fast recovery without forwarding loops, in case of a single link or node failure.

Figure 3:
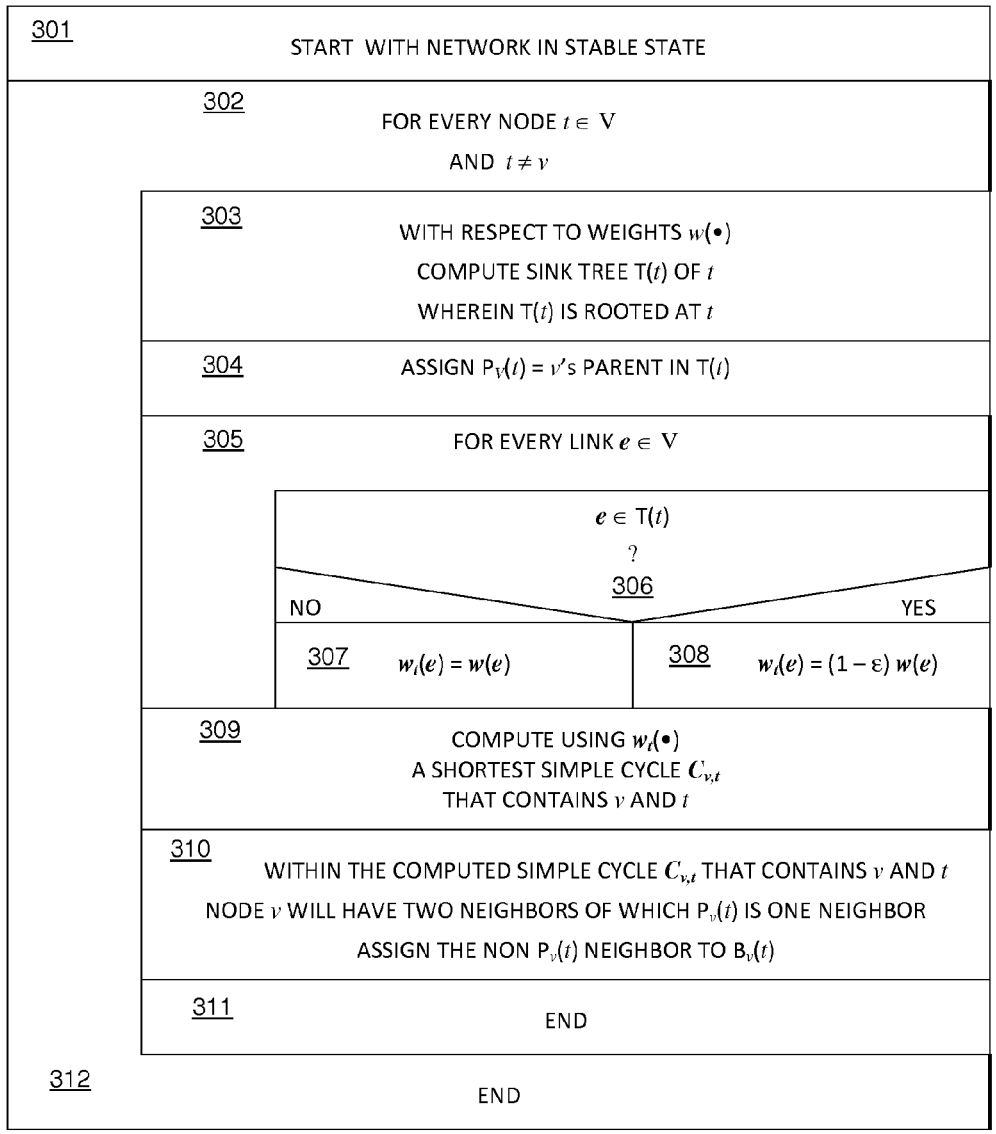
FIG. 3 illustrates structogram of a method of calculating primary and backup forwarding nodes according to an embodiment of the invention.

Embodiments of the present invention have two coordinating aspects. The first is series of steps, shown below in pseudo-code form, and described further in conjunction with FIG. 3, a structogram illustration of the steps; which is executed when the network is in a stable state by each node v to populate its FIB tables, in other words to determine the primary and backup neighbors for each destination node t.

The method comprises three general steps:

Step 1: Computation of sink tree. Node v calculates the sink tree T(t) of t, with ties resolved by a predefined criterion common to all nodes. The parent of v in T(t) is immediately designated as the primary neighbor $p_v(t)$.

Step 2: Weight manipulation. The weight of links that belong to T(t) is slightly reduced, so that in the subsequent shortest cycle computation ties are broken in favor of cycles having greater overlap with T(t). For every link e ∈ E, there is defined a temporary real-valued weight $w_t(e)$ as follows:

$$w_t(e) = \begin{cases} (1-\varepsilon) \cdot w(e) & \text{if } e \in T(t) \\ w(e) & \text{otherwise} \end{cases}$$

where ε is a positive constant such that $$\varepsilon < \frac{1}{\sum_{e \in E} w(e)}.$$

Step 3: Computation of a shortest cycle. Node v calculates the shortest cycle $C_{v;t}$ that contains v and t, with respect to weights $w_t(\cdot)$, using any suitable method. As demonstrated later, one of the two neighbors of v in $C_{v;t}$ is $p_v(t)$, so the other is selected as the backup neighbor $b_v(t)$.

PSEUDO CODE Representation for Method of FIB Table Rendering at a Given Node v

1: for every node t ≠ v do
2:   w.r.t. weights w(·), compute sink tree T(t) of t   { T(t) is rooted at t }
3:   $p_v(t)$ = v's parent in T(t)
4:   for every link e do
5:     if e ∈ T(t) then
6:       $w_t(e) = (1-\varepsilon) \cdot w(e)$
7:     else
8:       $w_t(e) = w(e)$
9:   w.r.t. weights $w_t(\cdot)$, compute a shortest simple cycle $C_{v;t}$ that contains both v and t
     { v has two neighboring nodes in $C_{v;t}$; one of them is $p_v(t)$ }
10:  $b_v(t)$ = the other neighbor of v in $C_{v;t}$ Referring now to FIG. 3 there may be seen a structogram representation according to an embodiment of the method. The method commences at step 301 for node v with the network in a stable state. At step 302 a conditional step is entered which performs the subsequent calculations over all destination nodes t in the network V which are not the node v itself. At step 303 a sink tree T(t) is determined, rooted at destination node t using network configuration information w(•) regarding the link weights. At step 304 the sink tree T(t) is used to assign the parent of v in T(t) as node $p_v(t)$. Next, at step 305 a conditional loop is entered which examines every link in the network to determine at step 306 whether the respective edge is an edge within sink tree T(t). If the respective edge is not, then at step 307 the modified weight for that edge is set to be its initial weight. If the respective edge is an edge within sink tree T(t), then at step 308 the modified weight for that edge is set to an incrementally smaller value than its initial weight. As described earlier, the net effect of the steps within conditional loop 305 is to reduce the weight of the edges of sink tree T(t) so as to make those edges a preferred tie-breaker between simple cycles.

Next, at step 309 the simplest cycle $C_{v;t}$ containing v and t is calculated using the modified weights $w_t(\cdot)$. At step 310 the two neighbors of node v in $C_{v;t}$ are the desired primary neighbor $p_v(t)$ and backup neighbor $b_v(t)$ of node v. As the primary neighbor $p_v(t)$ is already known from step 304, the other of the two neighbors in $C_{v;t}$ is assigned to be the backup neighbor $b_v(t)$. At step 311 the loop for particular node v ends and control reverts back to step 302. Upon completion of step 302 the method ends at step 312.

The second aspect of the invention is a series of steps that is executed by each node v every time it receives a packet, to determine how the latter should be routed. This series of steps is shown below in pseudo-code form, and described further in conjunction with FIG. 4, a structogram illustration of the steps. Since the failure of a node causes all links incident to that node to become unavailable as well, this second series of steps does not have to distinguish between link and node failures, and behaves identically in both cases.

---
PSEUDO CODE Representation for Method of Routing a Packet at Node v
---
```
1:  t = destination of packet {assume t ≠ v}
2:  if link (v, p_v(t)) is unavailable or
    packet arrived directly from p_v(t) then
3:     if link (v, b_v(t)) is unavailable then
4:        drop packet
5:     else
6:        forward packet to b_v(t)    {backup neighbor}
7:     else
8:        forward packet to p_v(t)    {primary neighbor}
```
---

Figure 4:
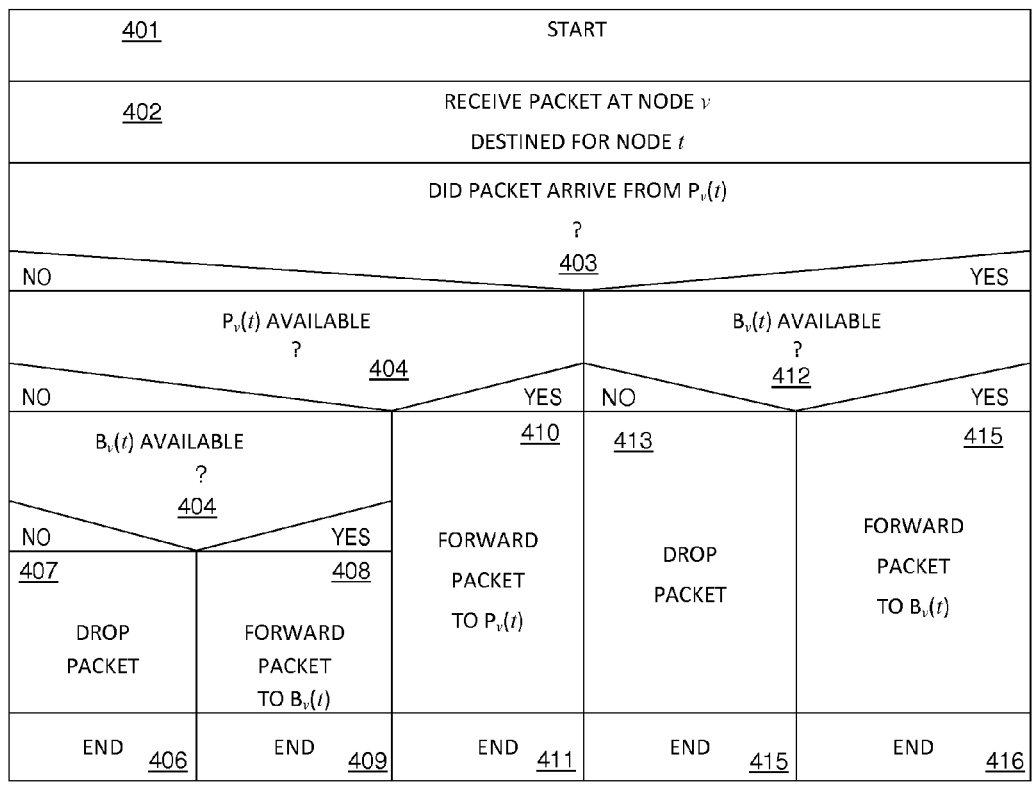
FIG. 4 illustrates a structogram of a method of routing a packet to primary and backup forwarding nodes according to an embodiment of the invention.
Figure 5:
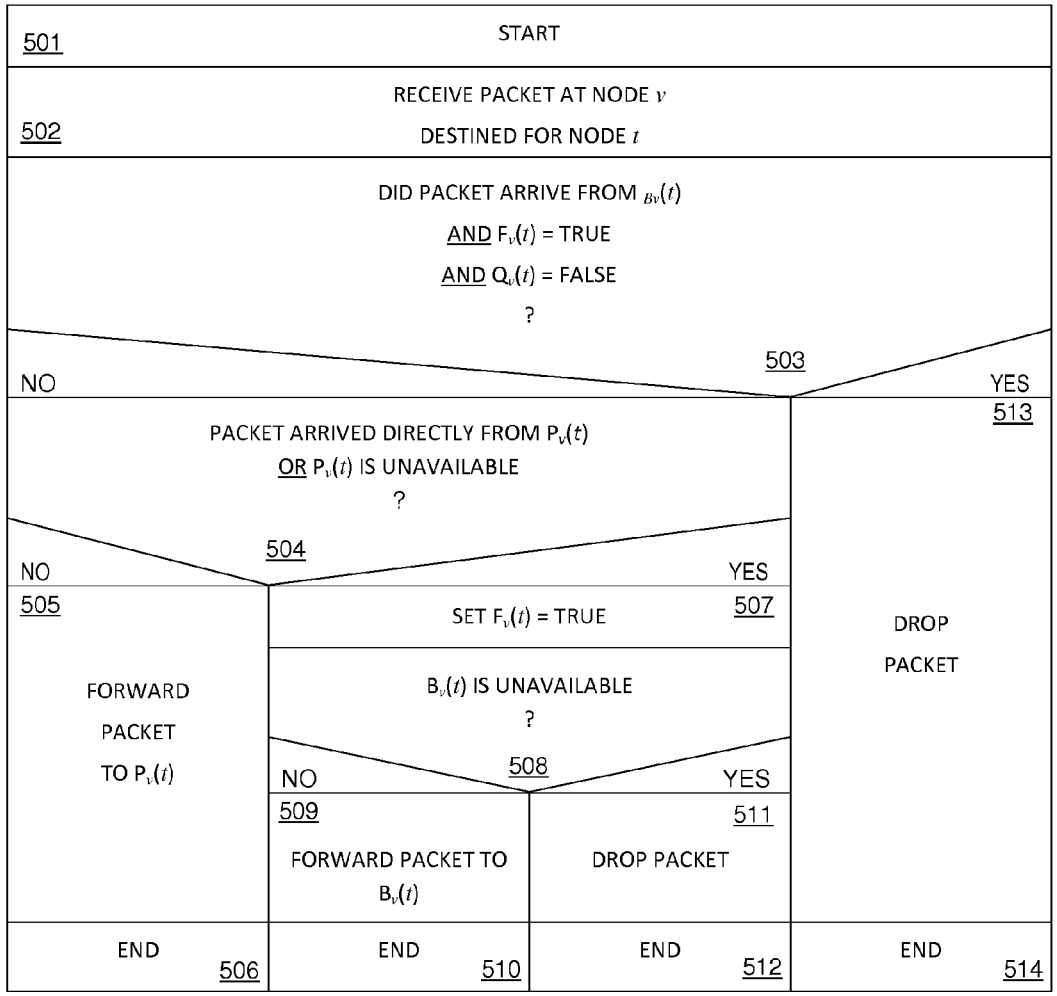
FIG. 5 illustrates a structogram of a method of routing a packet to primary and backup forwarding nodes according to another embodiment of the invention.

Referring now to FIG. 4 there may be seen a structogram representation according to an embodiment of the method. The method commences at step 401. At step 402 a packet is received at node v destined for node t. At step 403 a check is made as to whether the packet arrived from primary neighbor $p_v(t)$. If the answer is negative, then at step 404 a check is made as to whether neighbor $p_v(t)$ is available. If the answer is negative, then at step 405 a check is made as to whether link $b_v(t)$ is available. If the answer to this check is negative, then neither primary nor backup neighbors are available and at step 406 the packet is dropped. The method subsequently ends at step 407. In the event that the check at step 405 was affirmative i.e. that the backup neighbor is available, then at step 408 the packet is forwarded to backup neighbor $b_v(t)$ and the method subsequently ends at step 409. In the event that the check at step 404 was affirmative, i.e. that the primary neighbor is available, then at step 410 the packet is forwarded to primary neighbor $p_v(t)$ and the method subsequently ends at step 411.

In the event that the check at step 403 was affirmative, i.e. the packet did arrive from neighbor $p_v(t)$, then at step 412 a check is made as to whether neighbor $b_v(t)$ is available. If the answer is negative then at step 413 the packet is dropped and the method ends at step 414. In the event that the check at step 412 was affirmative i.e. neighbor $b_v(t)$ is available, then at step 415 the packet is forwarded to neighbor $b_v(t)$ and the method ends at step 416.

Figures 2A, 2B:
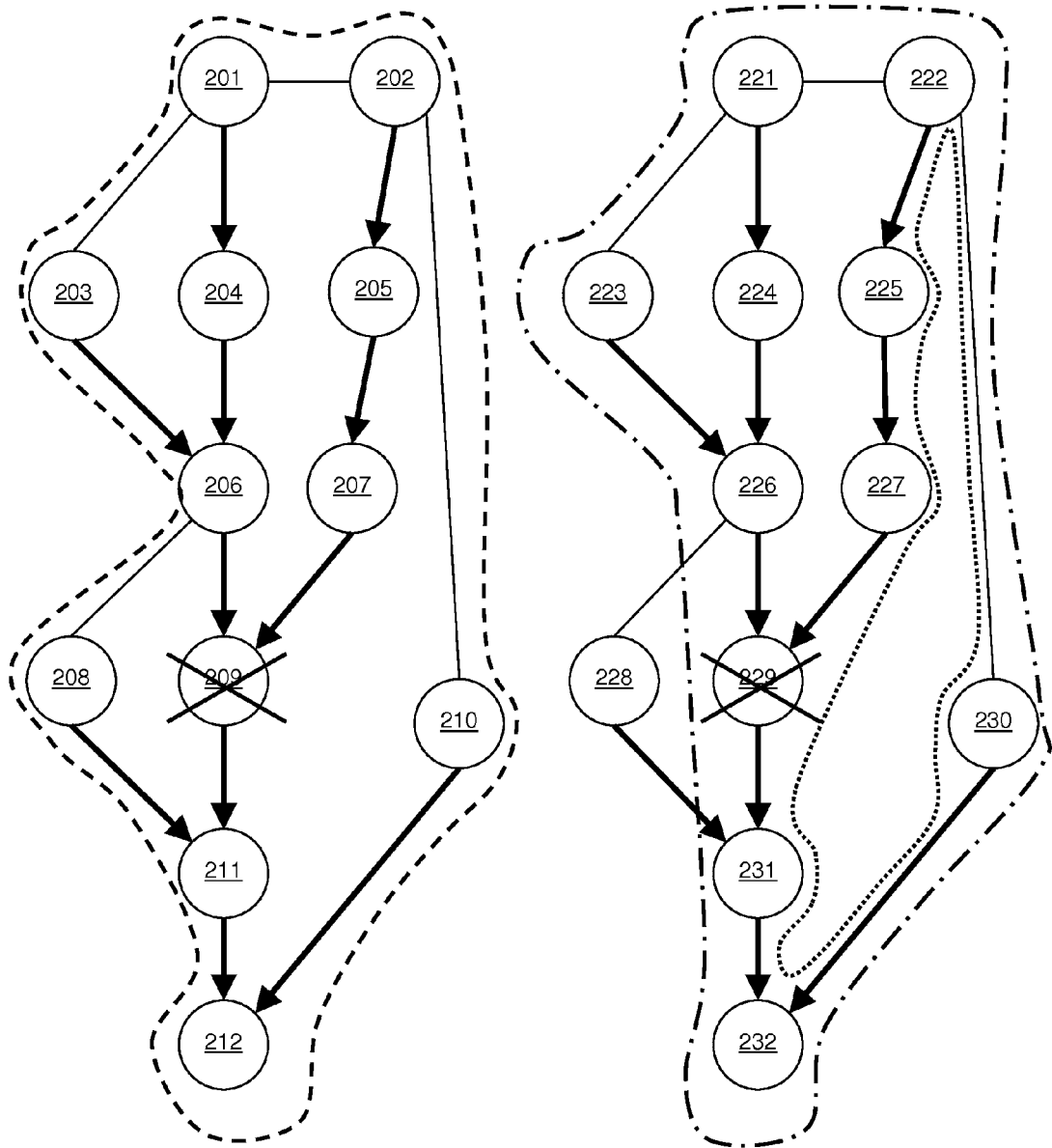
FIGS. 2A and 2B illustrates a network of nodes having connecting links according to an embodiment of the invention in operation.

For another example, consider the network depicted in FIG. 2B, and suppose that node 228 fails. Under embodiments of the invention, a packet at node 226 that is destined for node 232 will be forwarded to node 224, then to node 221, and then to node 222.

However, node 221 is not the primary neighbor of node 222, hence the packet is subsequently routed to node 225 and then to node 227. Observe that the cycle $C_{227;232}$ is shorter than $C_{226;232}$, so the packet is "making progress". At node 227, the packet has to be rerouted again, going through nodes 205, 202, and 210, before finally arriving at node 212.

In the above example, it may be noted that a rerouted packet visits each node at most twice. This property holds in general for embodiments of the invention.

Further Extensions

A. Failure of the Destination Node and Multiple Failures

Although embodiments of the invention as described previously can compensate for lost links and nodes, packet deliver does not include packets destined for a failed node because their delivery is obviously impossible. However, such packets may remain in the network and enter forwarding loops, thus unduly increasing the traffic load on links and nodes along those loops. For example, in case node 110 of the network in FIG. 1A fails, packets to node 110 end up bouncing back and forth along the path of nodes 101; 103; 105; 107; 108. Ideally, these packets should be dropped as soon as possible.

A similar problem may arise if multiple failures occur at the same time in the network, and in particular if packets that have been rerouted because of a failure encounter another failure along their alternative path. Any alternative path towards a destination t must contain at least one link not in the sink tree T(t), and let ê be the first such link. If the failure in the alternative path occurs before ê, then those packets will be dropped (see line 4 in the previously given pseudo-code for routing a packet), otherwise they may enter a forwarding loop.

Loops can be prevented in the above scenarios, as per the following modifications to embodiments of the invention. For every node v and each destination t, there is added two Boolean flags $f_v(t)$ and $q_v(t)$ to the FIB entry of v for t, which already contains the pointers $p_v(t)$ and $b_v(t)$. Flag $f_v(t)$ indicates whether v has detected a failure along the shortest path from v to t, and $q_v(t)$ indicates whether the link (v; $b_v(t)$) belongs to the sink tree T(t). Furthermore, the steps to the first aspect are modified so that it sets $q_v(t)$ to the appropriate value, after computing T(t) and $b_v(t)$, and also sets $f_v(t)$ to false. Last but not least, the first routing method is replaced by the following routing method, which sets $f_v(t)$ to true when node v has to reroute packets destined for node t because of a failure.

If a packet to t is received from $b_v(t)$ while a failure has been detected (i.e. $f_v(t)$ is true) and (v; $b_v(t)$)∉T(t) (i.e. $q_v(t)$ is false), then the method realizes that another failure has occurred along the alternative path to t, and drops the packet to avoid creating a loop. Thus, this embodiment gracefully avoids transient routing loops even in the presence of multiple failures.

B. Asymmetric Link Weights

Sometimes, a bidirectional link may have different routing weights in each direction. In that case, the network is more appropriately modeled by a directed graph instead of an undirected one, such that each bidirectional link is represented by two antiparallel directed edges with different weights.

Moreover, let $\bar{e}$ denote the antiparallel edge of a given edge $e \in E$. Embodiments of the invention can be adapted to work in such networks, by modifying the definition of temporary weights in Step 2 of the pseudo-code represented method for FIB Table Rendering as follows:

$$w_t(e) = \begin{cases} (1-\varepsilon) \cdot \min\{w(e), w(\bar{e})\} & \text{if } e \in T(t) \text{ or } \bar{e} \in T(t); \\ \max\{w(e), w(\bar{e})\} & \text{otherwise.} \end{cases}$$

Note that $w_t(e) = w_t(\bar{e})$. As before, this assignment breaks ties in favor of cycles having greater overlap with T(t), without affecting T(t) itself. Thus, in a stable state packets are still forwarded along the shortest paths to their destinations.

C. Non-Biconnected Networks

Hitherto, it has been assumed that the network is biconnected. Otherwise, it must contain cut nodes and/or cut links, so if any of those fails then recovery is impossible as there is no other path. Nevertheless, even in such cases some protection can be ensured against other component failures, as shown below.

If the network has cut nodes but no cut links, it is first partitioned into biconnected components, using for example a Depth-First Search method. Then, the method of building an FIB Table is performed on each component independently.

Finally, the remaining FIB entries are filled in as follows. If a node v and destination node t are in different components, we identify the first cut node, say y, along the shortest path from v to t. Observe that node y must belong to the same component as node v. Therefore, all values of the FIB entry of node v for destination y are copied to the FIB entry of node v for destination node t.

D. Loop-Free Fib Updates

Figure 6A:
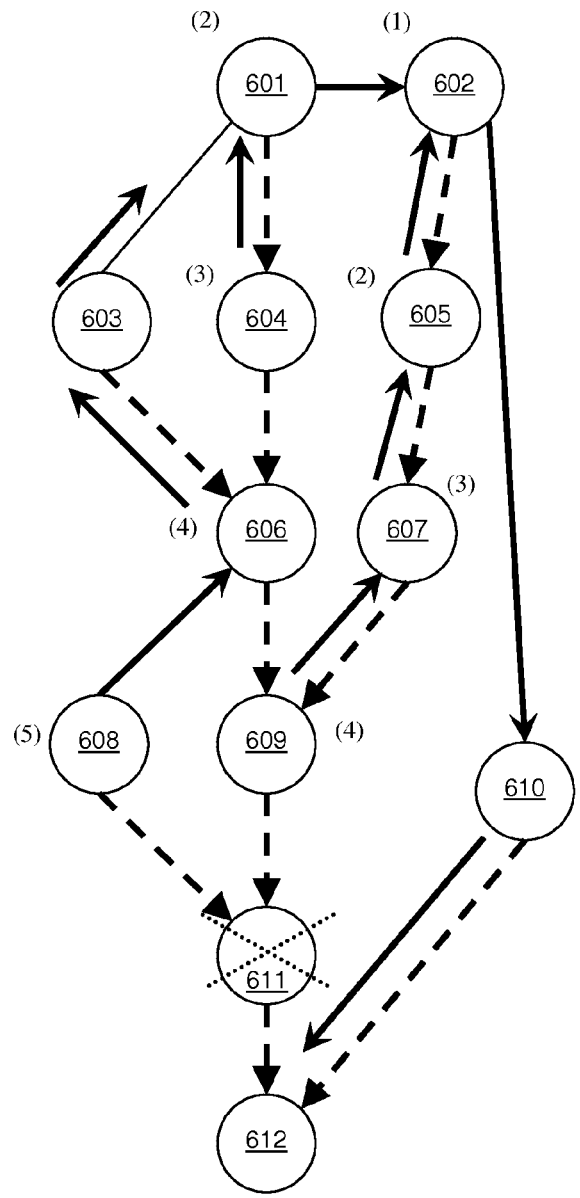
FIGS. 6A and 6B illustrates a network of nodes having connecting links according to an embodiment of the invention in operation.
Figure 6B:
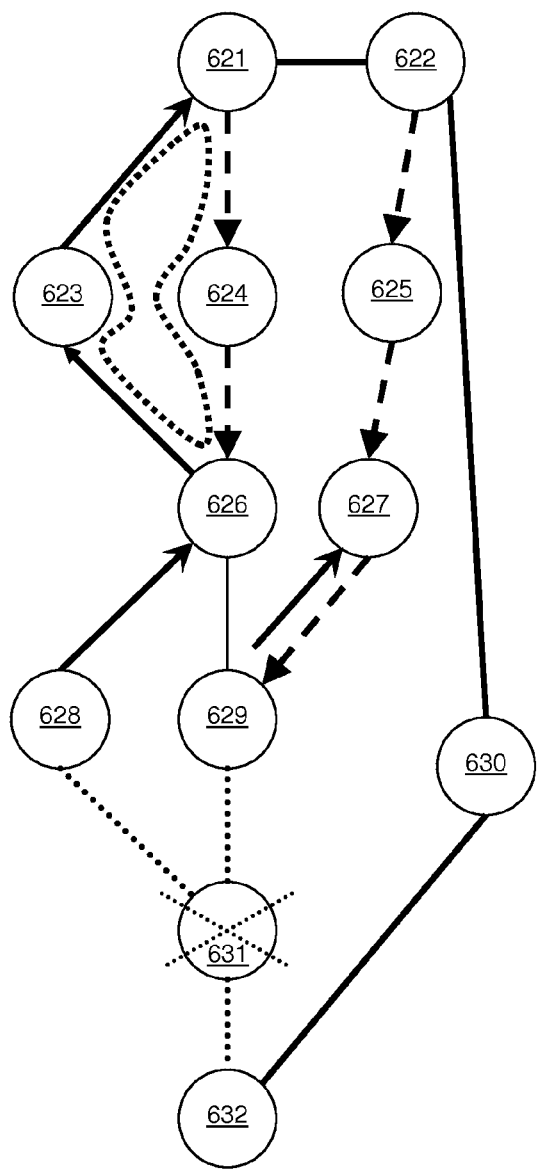

A primary cause of transient forwarding loops during the convergence time is the inconsistent views of the network topology that exists in different network nodes. For example, consider the network in FIG. 6 after the failure of node 611. Assume that nodes 606 and 603 have already updated their FIB tables to reflect the new sink tree of node 612, which is shown in FIG. 6A as the solid arrows, but nodes 601 and 604 have not. In such a scenario, a packet sent from 601 to 612 will enter a transient forwarding loop consisting of nodes 601; 604; 606 and 603.

According to an alternative embodiment of the invention the FIB update method ensures that every router v updates its FIB table entry for destination t after all routers that are ancestors of v in the new sink tree of t. This is achieved by scheduling this update according to the depth (i.e. hop-count distance from t) of v in the new sink tree.

By way of example, assume that node v gets an LSA message at time $\tau$, which it forwards to its neighbors and uses to compute the new sink tree T'(t) for each destination t. Let u be the nearest ancestor of v in T'(t) whose path to t is not affected by the topology change, and denote by d(v;u) the hop-count distance from v to u in T'(t). Then, v should update its FIB table entry for t at time $\tau+\Delta d(v;u)$, where $\Delta$ is the maximal propagation time of an LSA message over a link, including the time needed to compute the new sink trees.

By way of a more specific example, consider the network depicted in FIG. 6A after the failure of node 611, and suppose $\Delta=1$. The number next to each node is its hop-count distance to the nearest unaffected node in T'(t), which here is node 610. Once node 609 detects the failure at time 0, it immediately sends LSA messages to nodes 606 and 607, which forward the messages to their neighbors, and so on. Thus, node 602 is informed of the failure at time $\Delta=3$ and updates its FIB entry for t at time $\tau+\Delta d(602;601)=3+1=4$.

Similarly, nodes 601; 604; 606, and 603 all update their FIB entries for t at time 5, etc.

Simulation Results

Network Instances.

In order to assess the suitability of embodiments of the invention for deployment on service provider networks, simulations were conducted on a number of realistic topologies that are publicly available at the following references:

K. Tse. *AT&T's photonic network*. In OFC/NFOEC 2008, Mar. 2008 [APN network instance];

K. Wang, M. Ali, and J. Deogun. *Multicast routing in 40 Gb/s heterogeneous optical networks*. In IEEE ICC, volume 3, pages 1620-1624, May 2005 [ITALY network instance];

Y. Xiong and L. Mason. *Restoration strategies and spare capacity requirements in self-healing ATM networks*. IEEE/ACM Trans. Netw., 7(1):98-110, 1999 [TORONTO, USLD and NJLATA network instances];

E. B. Basch, R. Egorov, S. Gringeri, and S. Elby. *Architectural tradeoffs for reconfigurable dense wavelength-division multiplexing systems*. IEEE Selected Topics in Quantum Electronics, 12(4):615-626, 2006 [MAN network instance]; and *Rocketfuel: An ISP topology mapping engine* [AS3697 network instance].

[Available at http://www.cs.washington.edu/research/networking/rocketfuel/].

Their sizes range from 11 nodes and 23 edges (NJLATA) to 148 nodes and 370 edges (AS 3967), and their average node degrees are specified in Table 1.

TABLE 1

| Network Instance | Avg Node Degree | DisPath Link Failures Stretch | | DisPath Node Failures Stretch | |
|---|---|---|---|---|---|
| | | avg | max | avg | max |
| NJLATA | 4.18 | 1.0633 | 1.6471 | 1.0047 | 1.1149 |
| ITALY | 3.43 | 1.1040 | 2.2000 | 1.0347 | 1.5000 |
| TORONTO | 4.40 | 1.0934 | 1.9559 | 1.0533 | 1.6000 |
| USLD | 3.21 | 1.1232 | 2.3621 | 1.0828 | 1.8602 |
| APN | 3.15 | 1.1427 | 2.6034 | 1.1096 | 2.4310 |
| MAN | 2.31 | 1.2476 | 3.7995 | 1.1897 | 2.4999 |
| AS 3967 | 5.00 | 1.1038 | 4.2163 | 1.0683 | 4.2163 |

Evaluated Schemes:

The performance of DisPath was compared against schemes with similar characteristics, in particular those with: (a) no changes to the IP packets; (b) in stable state, packets are routed along the shortest path to their destination; (c) every router keeps only two pointers per destination, to the primary and backup neighbors. Among the various solutions proposed in the literature, only LFA and U-turn meet all the above criteria. These schemes have low complexity, like DisPath, and they have also received extensive consideration by the industry. Indeed, they are commonly used as benchmarks for evaluating the performance of other IP FRR schemes as described in articles such as M. Gjoka, V. Ram, and X. Yang. Evaluation of IP fast reroute proposals. In Proceedings of IEEE COMSWARE, 2007; and M. Goyal, M. Soperi, E. Baccelli, G. Choudhury, A. Shaikh, H. Hosseini, and K. Trivedi. *Improving convergence speed and scalability in OSPF: A survey*. IEEE Communications Surveys and Tutorials, 2011.

Performance Metrics:

The performance of the evaluated schemes was compared with respect to two performance measures:

Coverage: Coverage against link failures is the percentage of source-destination pairs that are protected against any single link failure, and coverage against node failures is the percentage of pairs that are protected against any single node failure, excluding the failure of their destination. Recall that, unlike the other evaluated schemes, DisPath provides 100% coverage for both link and node failures.

Stretch: Given a source-destination pair and a failed component along its shortest path, the stretch is the ratio between the length of the alternative route to the length of the shortest source-destination path not including the failed network component.

For each network instance, there was recorded both the average and the maximum stretch over all source-destination paths for all link failures and, separately, for all node failures.

Evaluation Results:

The simulation results are displayed in Tables 1 and 2. The first table suggests that the average stretch of DisPath remains acceptably low in the test instances.

Table 2 presents the results of the comparative tests. Note that the average and maximum stretch of LFA (and of U-turn, respectively), are computed while taking into account only source-destination pairs for which the scheme provides a loop-free alternative path. These values are juxtaposed to the "equivalent" average and maximum stretch of DisPath over those same pairs.

Clearly, in almost all test instances neither LFA nor U-turn manage to offer protection against every failure, although the latter scheme often comes close, as long as the network does not have low average node degree. Moreover, on top of always guaranteeing 100% coverage, DisPath typically outperforms the other two schemes in terms of stretch, and even when not, it fares at most slightly worse. Consequently, these experimental results produce strong evidence that DisPath is all-round preferable to both LFA and U-turn.

Therefore what has been disclosed is a novel IP Fast Reroute scheme that provides full protection for any single link or node failure in a network that is modeled as a biconnected graph.

Unlike several schemes presented in the literature, embodiments of the invention do not require any changes to the IP packet format. With basic requirements on the forwarding table same as those stipulated by LFA, and a straightforward failure detection method identical to the one employed by U-turn embodiments of the invention offers 100% coverage against single link or node failures. Presented have been several important properties of embodiments and also shown, through simulation results using several realistic network instances, that embodiments of the invention are very competitive in terms of stretch as well.

The simplicity, full protection against single link and node failures, and the appealing stretch factor support the belief that embodiments of the invention will comprise a strong candidate for a credible, practical solution for IP FRR.

Note, in the preceding discussion a person of skill in the art would readily recognize that steps of various above-described methods can be performed by appropriately configured network processors. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices are all tangible and non-transitory storage media and may be, e.g., digital memories, magnetic storage media such as a magnetic disks and magnetic tapes, hard drives, or optically readable digital data storage media. The embodiments are also intended to cover network element processors programmed to perform said steps of the above-described methods.

Numerous modifications, variations and adaptations may be made to the embodiment of the invention described above without departing from the scope of the invention, which is defined in the claims.

TABLE 2

|  | Network Instance | Link Failures | | | | | Node Failures | | | | |
| --- | --- | --- | --- | --- | --- | --- | --- | --- | --- | --- | --- |
|  |  |  | Stretch | | DisPath Stretch | |  | Stretch | | DisPath Stretch | |
|  |  | Coverage | avg | max | avg | max | Coverage | avg | max | avg | max |
| LFA | NJLATA | 100.00% | 1.0693 | 1.6471 | 1.0633 | 1.6471 | 1.0000 | 1.0060 | 1.1149 | 1.0047 | 1.1149 |
|  | ITALY | 83.81% | 1.1142 | 2.6363 | 1.0888 | 1.7500 | 0.9048 | 1.0444 | 2.4167 | 1.0332 | 1.5000 |
|  | TORONTO | 97.33% | 1.1155 | 2.5294 | 1.0874 | 1.9559 | 0.9833 | 1.1013 | 2.6021 | 1.0511 | 1.6000 |
|  | USLD | 58.86% | 1.0666 | 2.5000 | 1.0691 | 2.3621 | 0.4974 | 1.0370 | 2.0864 | 1.0396 | 1.7143 |
|  | APN | 56.72% | 1.0429 | 1.8167 | 1.0707 | 1.9091 | 0.4006 | 1.0422 | 1.9314 | 1.0522 | 2.4310 |
|  | MAN | 8.08% | 1.0720 | 2.0000 | 1.0720 | 2.0000 | 0.0522 | 1.0248 | 1.5712 | 1.0263 | 1.6665 |
|  | AS 3967 | 73.84% | 1.0741 | 6.9353 | 1.0790 | 4.2163 | 0.5721 | 1.0469 | 5.8309 | 1.0421 | 4.2163 |
| U-turn | NJLATA | 100.00% | 1.0693 | 1.6471 | 1.0633 | 1.6471 | 1.0000 | 1.0060 | 1.1149 | 1.0047 | 1.1149 |
|  | ITALY | 100.00% | 1.1341 | 2.6363 | 1.1040 | 2.2000 | 0.9048 | 1.0496 | 2.4167 | 1.0332 | 1.5000 |
|  | TORONTO | 100.00% | 1.1263 | 2.5294 | 1.0934 | 1.9559 | 0.9967 | 1.1013 | 2.6021 | 1.0534 | 1.6000 |
|  | USLD | 98.15% | 1.1264 | 2.2203 | 1.1192 | 2.3621 | 0.9021 | 1.1109 | 2.2025 | 1.0788 | 1.8602 |
|  | APN | 96.40% | 1.1304 | 2.3421 | 1.1368 | 2.6034 | 0.9356 | 1.1003 | 2.2410 | 1.1052 | 2.4310 |
|  | MAN | 16.20% | 1.1326 | 2.2853 | 1.1289 | 2.1427 | 0.1059 | 1.1035 | 2.2853 | 1.1051 | 2.1426 |
|  | AS 3967 | 99.99% | 1.1136 | 7.6287 | 1.1038 | 4.2163 | 0.7960 | 1.0821 | 7.6287 | 1.0552 | 4.2163 |

What is claimed is:

1. A network element at a network node for routing an arriving packet having a destination node comprising:
   a router configured to forward said arriving packet to a next-hop neighbor node according to one of a first pointer and a second pointer associated to said destination node in a forwarding information table stored in a forwarding information memory storage, wherein said first pointer is directed to a first next-hop neighbor node which is on a shortest path from said network node to said destination node, said second pointer is directed to a second next-hop neighbor node different from said first next-hop neighbor node, and said second next-hop neighbor node is on a candidate cycle containing both said network node and said destination node having a greatest overlap with a sink tree rooted at said destination node.

2. The network element as claimed in claim 1, wherein said router is configured to forward said arriving packet according to said first pointer after said arriving packet arrives from a neighboring node other than the next-hop neighbor node indicated by said first pointer.

3. The network element as claimed in claim 2, wherein said router is configured to forward said arriving packet according to said second pointer after said arriving packet arrives from the next-hop neighbor node indicated by said first pointer.

4. The network element as claimed in claim 2, wherein said router is configured to forward said arriving packet according to said second pointer when the next-hop neighbor node indicated by said first pointer cannot forward packets.

5. The network element as claimed in claim 2, wherein said router is configured to forward said arriving packet according to said second pointer when a link to the next-hop neighbor node indicated by said first pointer cannot forward packets.

6. The network element as claimed in claim 1, further comprising:

a first flag and a second flag associated to said destination node in said forwarding information table stored in the forwarding information memory storage;

said first flag indicating an operational state of the shortest path from said network node to said destination node;

said second flag indicating whether a link from said network node to said second next-hop node is an element of said sink tree rooted at said destination node; and said router configured to drop said arriving packet in the event that said first flag indicates a non-operational state and that said second flag indicates that said network node to said second next-hop node is an element of said sink tree rooted at said destination node and that said arriving packet arrives from the next-hop neighbor node indicated by said first pointer.

7. The network element as claimed in claim 6, wherein said router is configured to forward said arriving packet according to said first pointer after said arriving packet arrives from a neighboring node other than the next-hop neighbor node indicated by said first pointer.

8. The network element as claimed in claim 6, wherein said router is configured to forward said arriving packet according to said second pointer after said arriving packet arrives from the next-hop neighbor node indicated by said first pointer.

9. The network element as claimed in claim 6, wherein said router is configured to forward said arriving packet according to said second pointer when the next-hop neighbor node indicated by said first pointer cannot forward packets.

10. The network element as claimed in claim 6, wherein said router is configured to forward said arriving packet according to said second pointer when the link to the next-hop neighbor node indicated by said first pointer cannot forward packets.

11. The network element as claimed in claim 1, wherein after arrival of network configuration information indicating a new network configuration for the network that said network element is a node therein, said forwarding information table is updated at a time succeeding a time period by which ancestral nodes to said network node on the sink tree corresponding to the new network configuration have been reconfigured.

12. The network element of claim 1, wherein manipulation of link weights occurs for the candidate cycle having the greatest overlap with the sink tree rooted at the destination node.

13. A method of automatically calculating a primary pointer and a backup pointer associated to a destination node in a forwarding information table stored in a forwarding information memory storage in a first network node of a network having a network configuration stored in a memory device, said method comprising:

calculating a sink tree rooted at said destination node using said network configuration of said network;

calculating a shortest path from said first network node to said destination node using said network configuration of said network;

directing said primary pointer to a first next-hop neighbor node which is on a shortest path from said first network node to said destination node;

directing said backup pointer to a second next-hop neighbor node different from said first next-hop neighbor node, said second next-hop neighbor node on a candidate cycle containing both said first network node and said destination node having a greatest overlap with the sink tree rooted at said destination node.

14. The method as claimed in claim 13, further comprising:
repeating said second calculating step and said directing steps for all nodes of said network other than said network node and said destination node.

15. The method as claimed in claim 14, further comprising:
receiving an update to said network configuration;
storing said update in said memory device;
calculating a new sink tree rooted at said destination node using said updated network configuration of said network;
updating said forwarding information table at a time succeeding a time period by which ancestral nodes to said network node on the sink tree corresponding to a new network configuration have been reconfigured by repeating the second calculating step and said directing steps for all nodes of said network other than said network node.

16. The method as claimed in claim 15, wherein further comprising:
calculating said time period according to a hop-count distance of a nearest ancestor in said new sink tree to said network node for which a path in said new sink tree from said nearest ancestor to said destination node has not changed.

17. The method of claim 13, further comprising:
manipulating link weights for the candidate cycle having the greatest overlap with the sink tree rooted at the destination node.

18. A method of automatically calculating a backup pointer associated to a destination node in a forwarding information table stored in a forwarding information memory storage in a first network node of a network having a network configuration stored in a memory device, said method comprising:

calculating a sink tree rooted at said destination node using said network configuration of said network;

calculating a shortest candidate cycle containing both said first network node and said destination node, wherein a tie-breaking criterion for candidate cycles comprises having a greatest overlap with said sink tree rooted at said destination node using said network configuration of said network;

calculating a shortest path from said first network node to said destination node using said network configuration of said network;

determining a first next-hop neighbor node which is on the shortest path from said first network node to said destination node; and directing said backup pointer to a second next-hop neighbor node different from said first next-hop neighbor node.

19. The method as claimed in claim 18, further comprising:
repeating said calculating, said determining, and said directing steps for all nodes of said network other than said network node and said destination node.

20. The method of claim 18, further comprising:
manipulating link weights for the candidate cycle having the greatest overlap with the sink tree rooted at the destination node.

* * * * *